US007710728B2

(12) United States Patent
Arisaka et al.

(10) Patent No.: US 7,710,728 B2
(45) Date of Patent: May 4, 2010

(54) ELECTRONIC DEVICE

(75) Inventors: Takayuki Arisaka, Tokyo (JP); Yuji Nakajima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 308 days.

(21) Appl. No.: 11/832,501

(22) Filed: Aug. 1, 2007

(65) Prior Publication Data

US 2008/0259537 A1 Oct. 23, 2008

(30) Foreign Application Priority Data

Sep. 29, 2006 (JP) ............................. 2006-268265

(51) Int. Cl.
*H05K 7/20* (2006.01)
*F28F 7/00* (2006.01)
*H01L 23/34* (2006.01)
*H05K 5/03* (2006.01)

(52) U.S. Cl. ...................... 361/719; 165/80.3; 165/185; 257/712; 361/679.54; 361/679.55; 361/690; 361/704; 361/715; 361/752; 361/759; 361/818

(58) Field of Classification Search ........................ None
See application file for complete search history.

(56) References Cited

U.S. PATENT DOCUMENTS 3,484,938 A * 12/1969 Sauer ........................... 29/887
5,402,311 A * 3/1995 Nakajima ............... 361/679.54
5,483,418 A * 1/1996 Hosoi ..................... 361/679.55
5,580,443 A * 12/1996 Yoshida et al. ............... 208/130
5,691,880 A * 11/1997 Seto et al. ............... 361/679.27
5,777,844 A * 7/1998 Kiefer ......................... 361/704
5,923,034 A * 7/1999 Ogasawara et al. ......... 250/311
5,923,084 A * 7/1999 Inoue et al. ................. 257/712
6,262,887 B1 * 7/2001 Lee ........................ 361/679.27
6,356,448 B1 * 3/2002 DiBene et al. ............... 361/721
7,031,165 B2 * 4/2006 Itabashi et al. ............... 361/719
2004/0160743 A1* 8/2004 Wu ............................ 361/719
2006/0077642 A1* 4/2006 Estes et al. .................. 361/752

FOREIGN PATENT DOCUMENTS

| JP | 09-331180 | 12/1997 |
| JP | 2003-347755 | 12/2003 |
| JP | 2005-019711 | 1/2005 |

* cited by examiner

*Primary Examiner*—Gregory D Thompson
(74) *Attorney, Agent, or Firm*—Blakely, Sokoloff, Taylor & Zafman LLP

(57) ABSTRACT

According to one embodiment, an electronic device includes a casing at least a part of which is made of metal, an in-casing member which is housed in the casing and becomes warm when the electronic device is in operation, and a boss member formed separately from the casing and made of resin. The boss member is attached to the metal part of the casing and is interposed between the casing and the in-casing member.

15 Claims, 14 Drawing Sheets

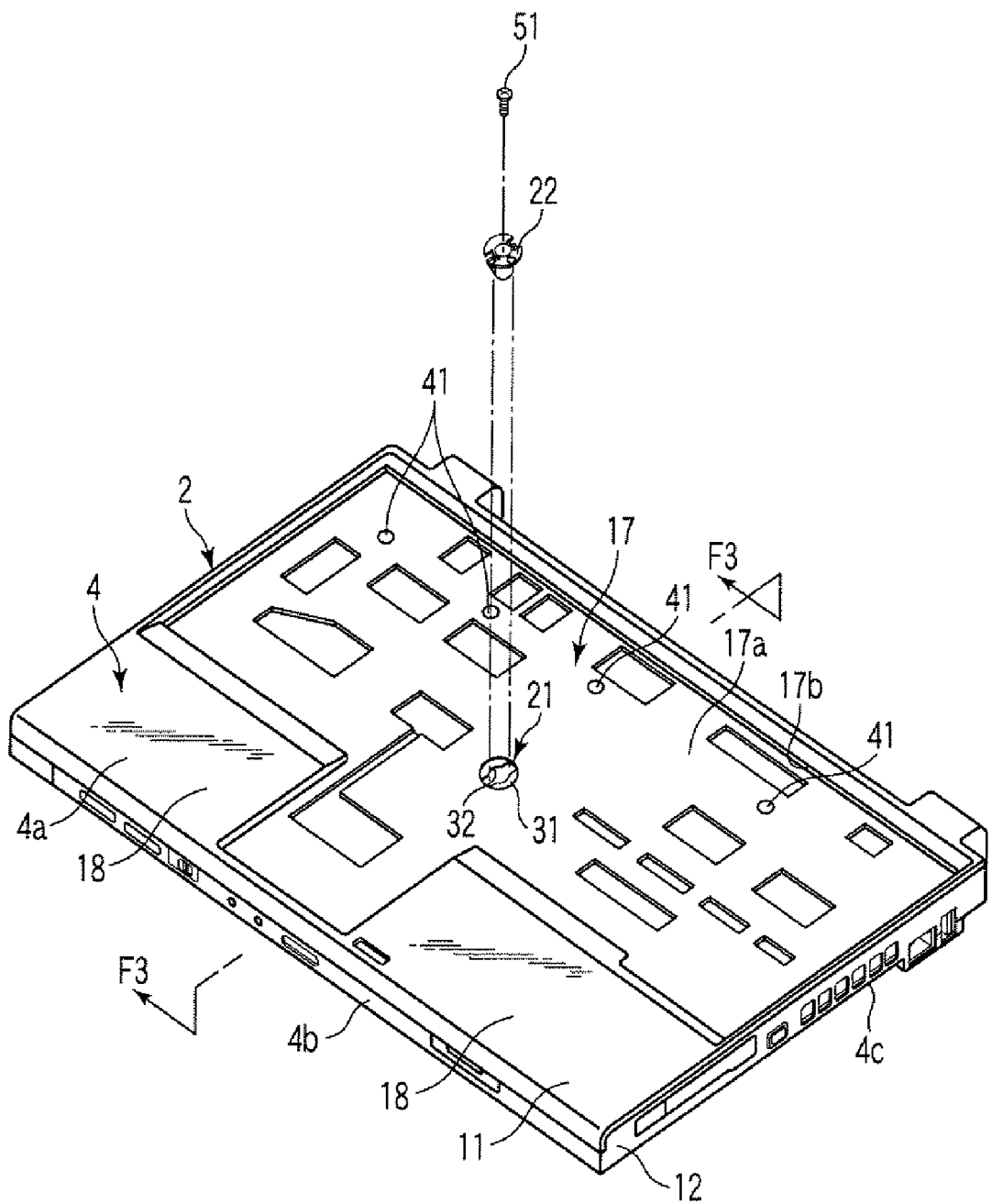
F I G. 2

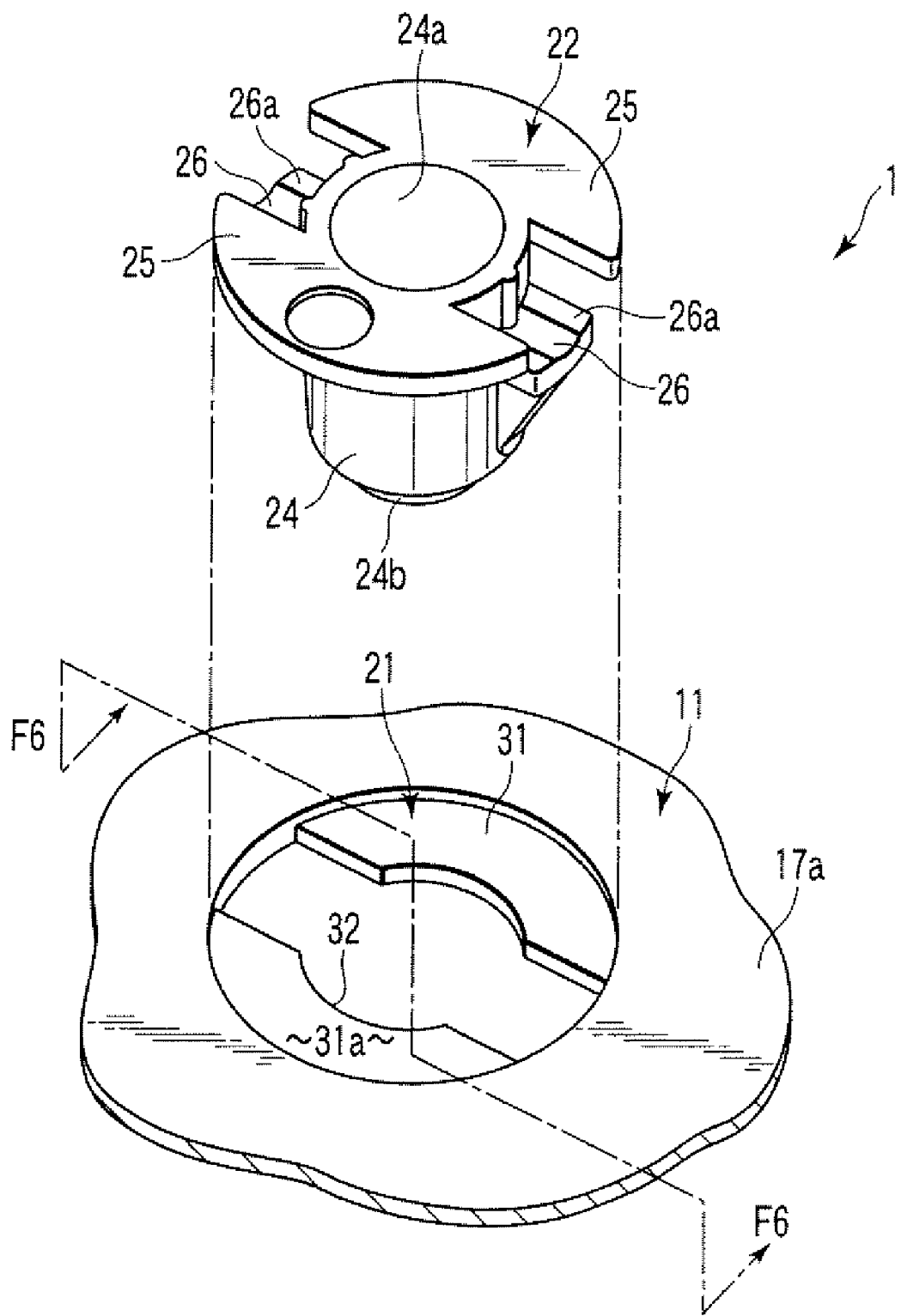
F I G. 4

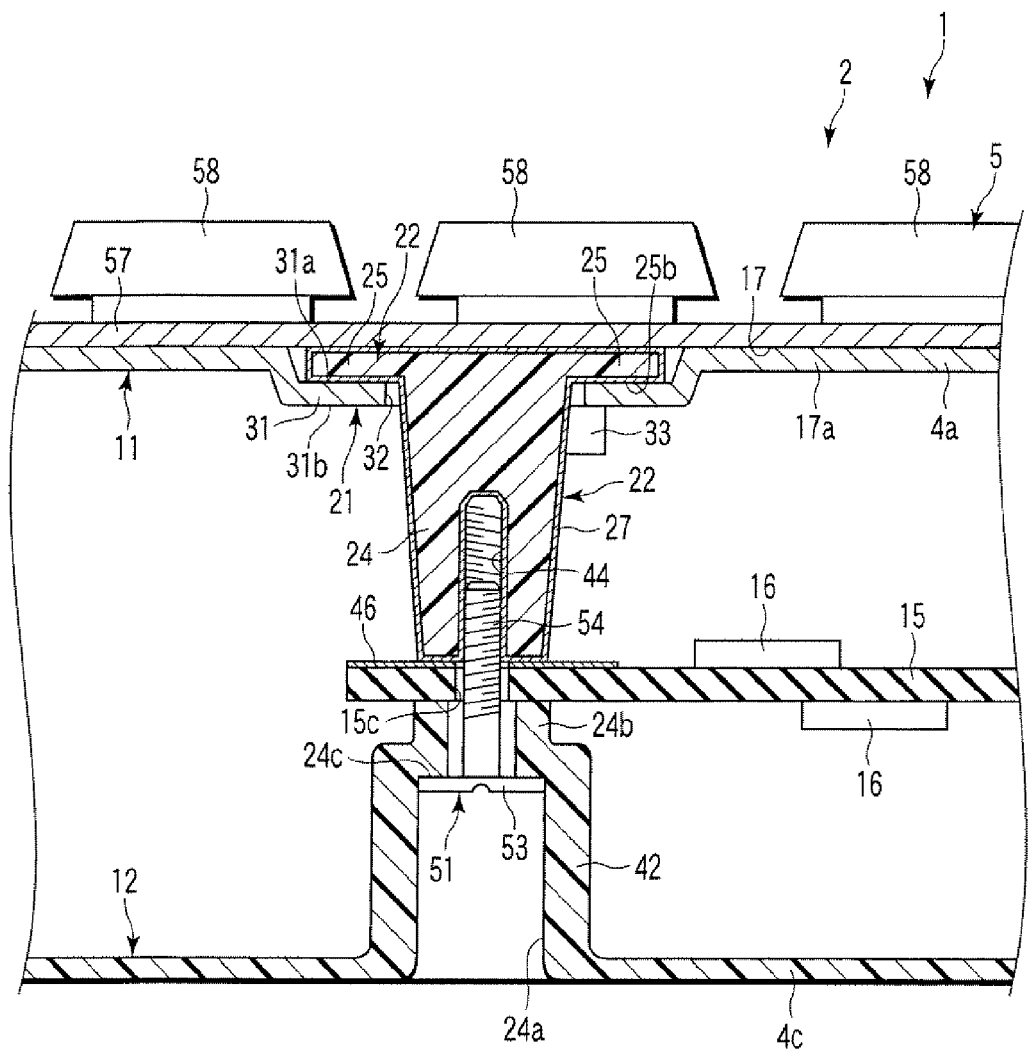
F I G. 8

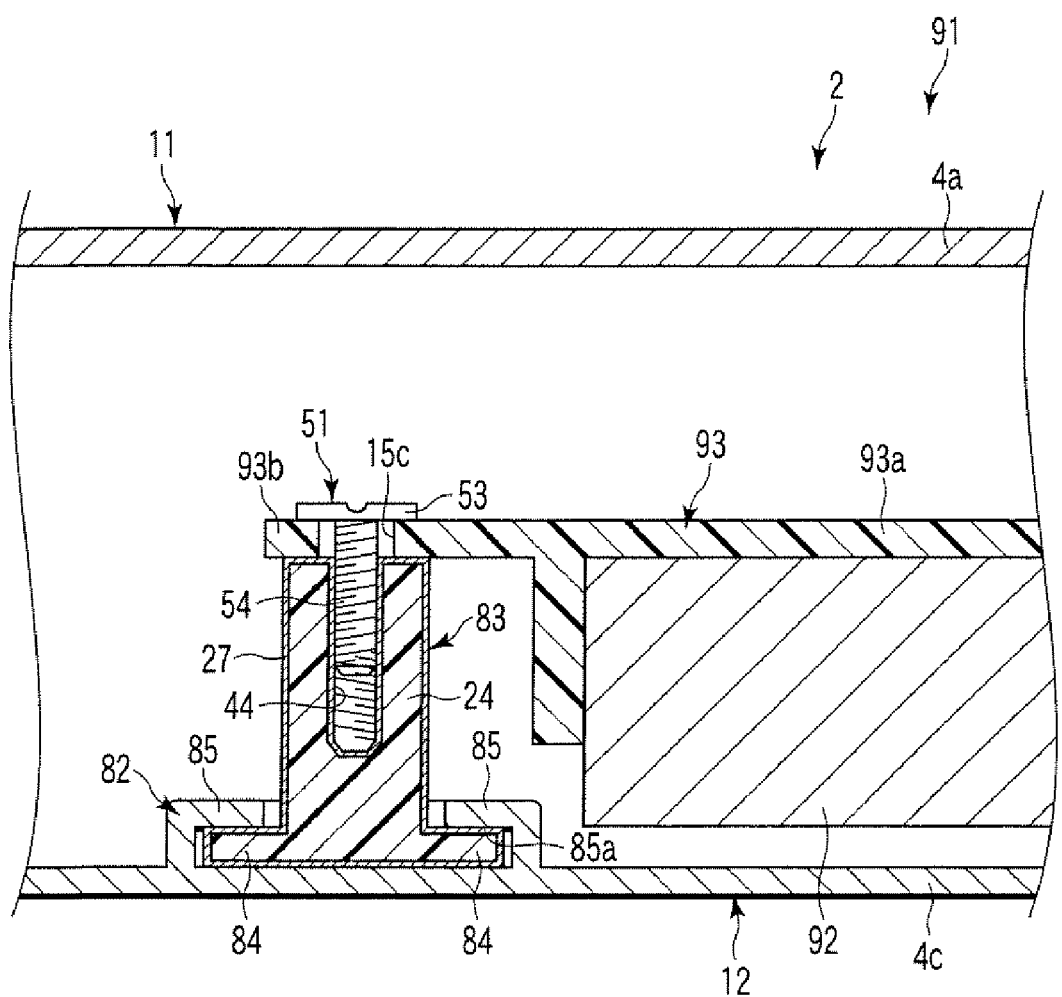
F I G. 13

ELECTRONIC DEVICE

CROSS-REFERENCE TO RELATED APPLICATIONS

This application is based upon and claims the benefit of priority from Japanese Patent Application No. 2006-268265, filed Sep. 29, 2006, the entire contents of which are incorporated herein by reference.

BACKGROUND

1. Field

One embodiment of the invention relates to an electronic device including a casing made of metal, for example, including a structure of a boss provided in the casing.

2. Description of the Related Art

Recently, a trend of thinning a casing of an electronic device such as a portable computer steadily continues. Many casings of electronic devices are made of resin. If the casing is to be further thinned in the future, it will be impossible to secure a desired rigidity for this casing. Therefore, attention has been paid to attempting to fabricate a casing of metal, such as an Mg alloy.

Jpn. Pat. Appln. KOKAI Publication No. 2003-347755 discloses a casing structure of a portable telephone featured in that the casing is made of an Mg alloy, which therefore enhances the electromagnetic wave-shielding function. The casing structure includes a printed wiring board housed in the casing, and a grounding spring connected at one end thereof to a grounding pattern of the printed wiring board and at the other end to the Mg alloy casing. The casing contains a pair of bosses that are placed on both sides of the printed wiring board. Those bosses are fastened to the printed wiring board by screws.

Various circuit components, such as a CPU and a north bridge, are mounted on the printed wiring board to be housed in the casing. Those circuit components generate heat when the device is in operation, which therefore heats the printed wiring board. In the casing structure, the bosses provided on the metallic casing are in contact with the printed wiring board. With such a structure, heat is transferred from the printed wiring board through the bosses to the casing, so the temperature of the casing will possibly rise. If the casing becomes too hot, a user cannot comfortably use the electronic device.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary perspective view showing a state that a keyboard unit of the portable computer according to the first embodiment is removed;

FIG. 4 is an exemplary perspective view showing a boss mounting portion of the main body of the portable computer according to the first embodiment when viewed from the outside of a computer casing;

FIG. 8 is an exemplary cross sectional view showing a modification of the portable computer according to the first embodiment;

FIG. 13 is an exemplary cross sectional view showing a portable computer according to a fifth embodiment of the invention.

DETAILED DESCRIPTION

Various embodiments according to the invention will be described hereinafter with reference to the accompanying drawings. In general, according to one embodiment of the invention, an electronic device includes: a casing at least a part of which is made of metal; an in-casing member which is housed in the casing and becomes warm when the electronic device is in operation; and a boss member formed separately from the casing and made of resin. The boss member is attached to the metal part of the casing and is interposed between the casing and the in-casing member.

Embodiments of the present invention, which are implemented in the form of a portable computer, will be described with reference to the accompanying drawings.

Figure 1:
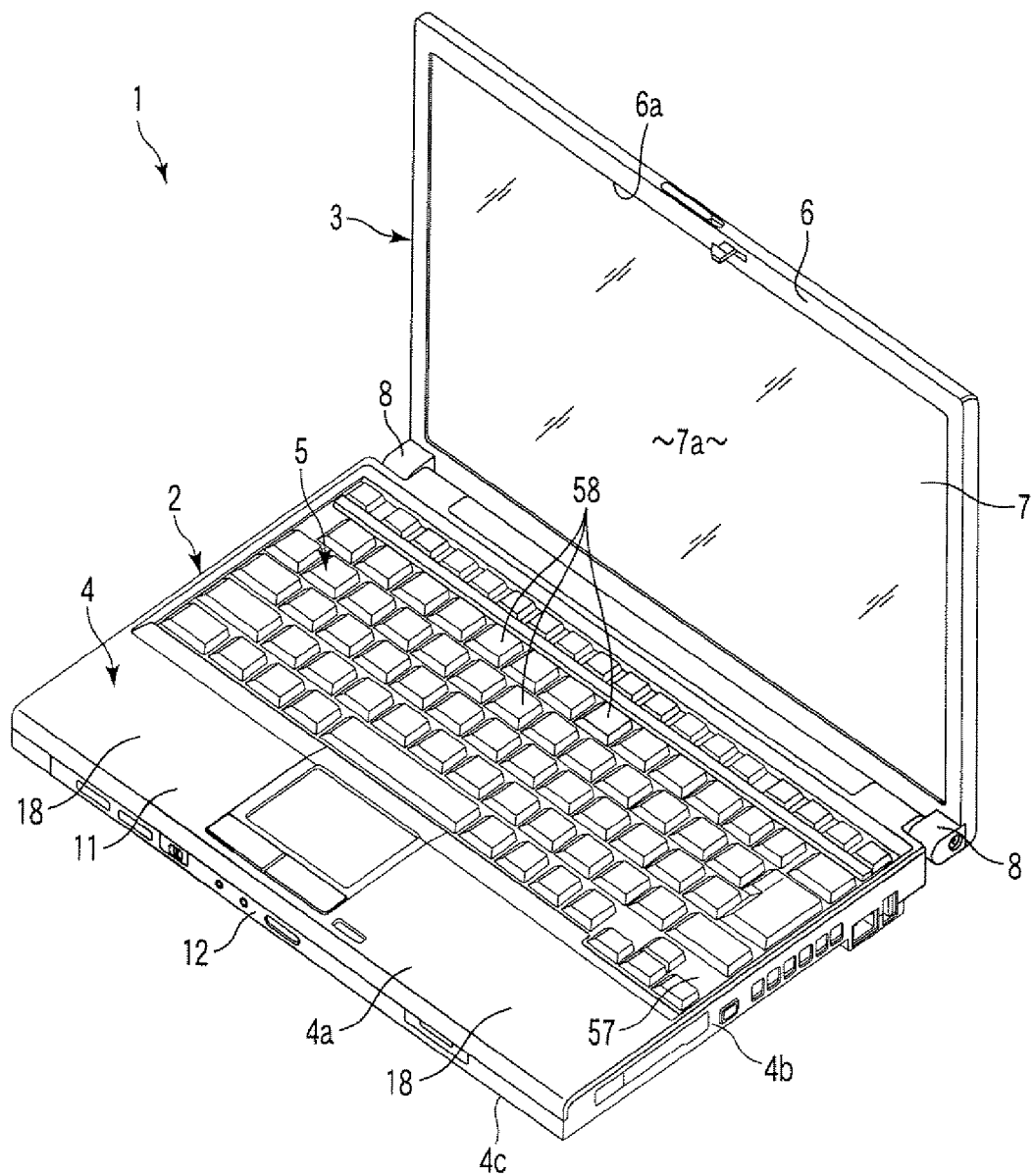
FIG. 1 is an exemplary perspective view showing a portable computer according to a first embodiment of the present invention.

FIGS. 1 to 7 show a portable computer 1 according to a first embodiment of the invention. The portable computer 1 is one example of an electronic device. As shown in FIG. 1, the portable computer 1 includes a main body 2 and a display unit 3.

The main body 2 includes a box-like casing 4. The casing 4 has an upper wall 4a, a peripheral wall 4b, and a lower wall 4c. The upper wall 4a supports a keyboard unit 5.

The display unit 3 includes a display housing 6, and a liquid crystal display module 7 housed in the display housing 6. The liquid crystal display module 7 has a display screen 7a. The display screen 7a is exposed to the exterior of the display housing 6 through a window 6a formed in the front side of the display housing 6.

The display unit 3 is supported at the rear end of the casing 4 with the aid of a hinge part 8. The display unit 3 may be tuned to between a closed position at which the display unit 3 is turned downward to cover the upper wall 4a from above, and an open position at which the display unit 3 is raised to expose the upper wall 4a and the display screen 7a.

Figure 3:
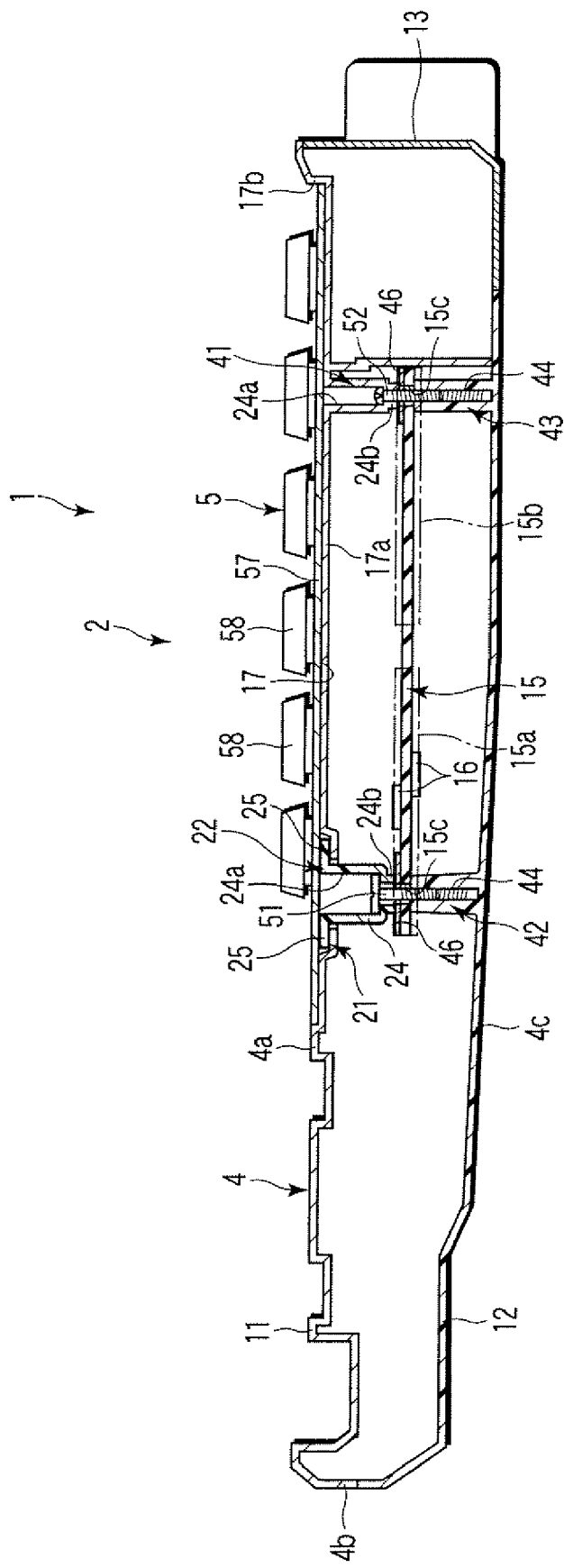
FIG. 3 is an exemplary cross sectional view showing the main body, taken along the line F3-F3 in FIG. 2.

As shown in FIGS. 2 and 3, the casing 4 includes a top cover 11 including the upper wall 4a, a bottom cover 12 including the lower wall 4c, and a rear cover 13. The top cover 11 is one example of "a first cover" of the invention. The bottom cover 12 is one example of "a second cover" of the invention. The top cover 11 is combined with the bottom cover 12 from above. The top cover 11 is removably supported on the bottom cover 12 and forms an accommodating space between the top cover itself and the bottom cover 12.

The top cover 11 of the embodiment is made of metal. An example of the metal forming the top cover 11 is a magnesium (Mg) alloy. One example of the bottom cover 12 is made of synthetic resin, for example. If required, the bottom cover 12 may be made of metal.

A printed circuit board 15 is located in the accommodating space of the casing 4. The printed circuit board 15 is one example of "an in-casing member" which becomes warm when the computer is in operation. Heating elements 16 such as a CPU and a north bridge are mounted on the printed circuit board 15. It is frequent that these heating elements 16 are mounted collectively at a specific area on the printed circuit board 15. Accordingly, in operation, heat generated by the heating elements 16 flows to the printed circuit board 15. As shown in FIG. 3, two areas are formed in the printed circuit board; one area is a first area 15a where the temperature becomes high, and the other is a second area 15b where the temperature rise is not as high as compared with the first area 15a, since the second area is less influenced by the heat generated from the heating elements 16.

As shown in FIG. 2, the upper wall 4a of the main body 2 includes a keyboard placing part 17 and a palm rest part 18. The palm rest part 18 extends in the longitudinal direction of the casing 4 on the front side of the keyboard placing part 17. The keyboard unit 5 is detachably attached to the keyboard placing part 17. The keyboard placing part 17 is depressed with respect to the upper wall 4a. More specifically, the keyboard placing part 17 includes a bottom wall 17a on which the keyboard unit 5 is placed, and a peripheral wall 17b which is raised from the peripheral edge of the bottom wall 17a and connects the bottom wall 17a to the upper wall 4a.

The bottom wall 17a of the keyboard placing part 17 includes a boss mounting part 21. As shown in FIG. 3, the boss mounting part 21 is arranged in opposition to the first area 15a of the printed circuit board 15. A boss member 22 is removably mounted to the boss mounting part 21.

Figure 5:
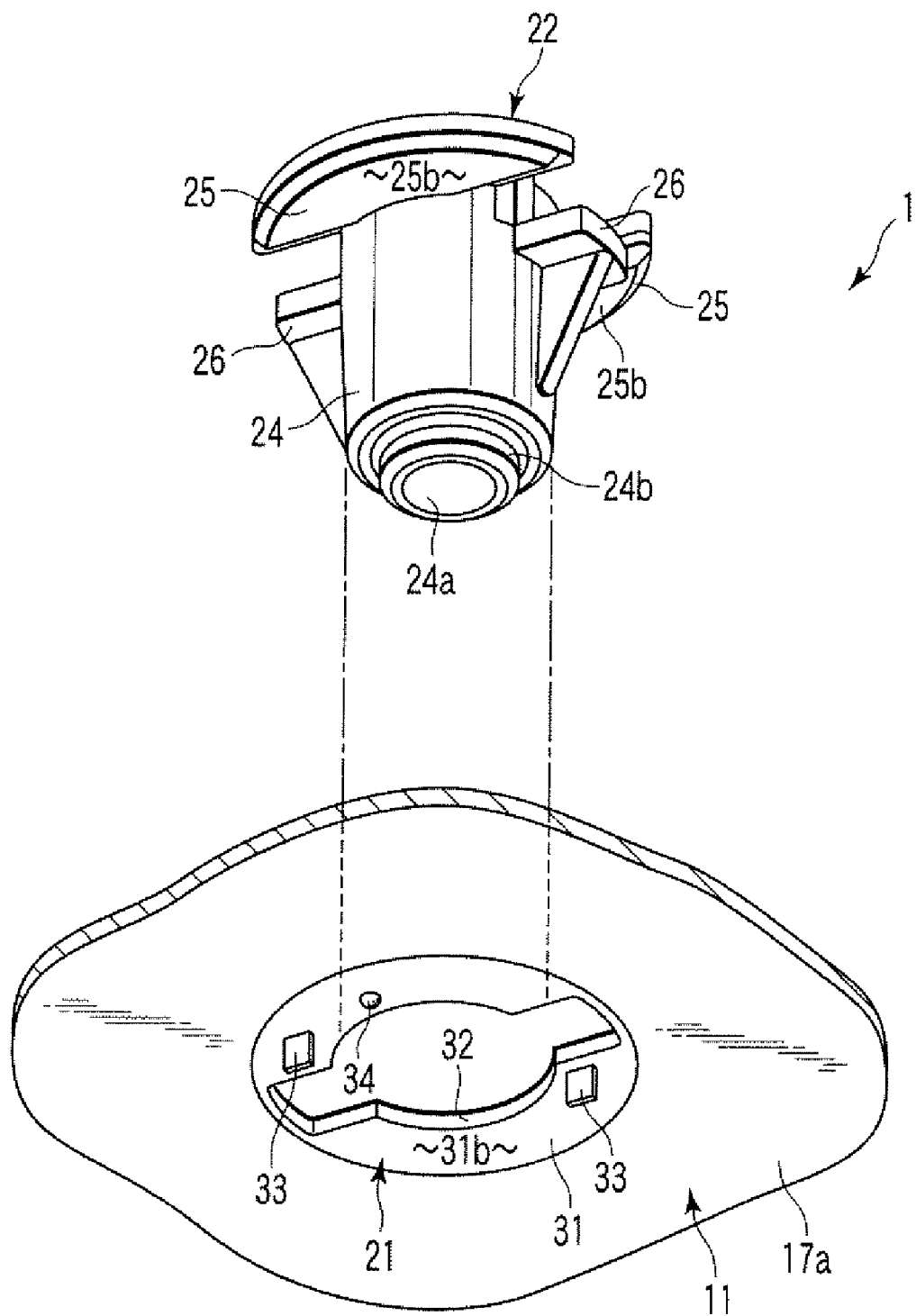
FIG. 5 is an exemplary perspective view showing the boss mounting portion of the main body of the portable computer according to the first embodiment when viewed from the inside of the computer casing.

FIG. 4 is a view showing the boss member 22 and the boss mounting part 21 when viewed from the outside of the casing 4. FIG. 5 is a view showing the boss member 22 and the boss mounting part 21 when viewed from the inside of the casing 4. The boss member 22 includes a body part 24 and pairs of first and second flange parts 25 and 26. The first flange part 25 is one example of "a first part" of the invention. The second flange part 26 is one example of "a second part" of the invention.

Figure 6:
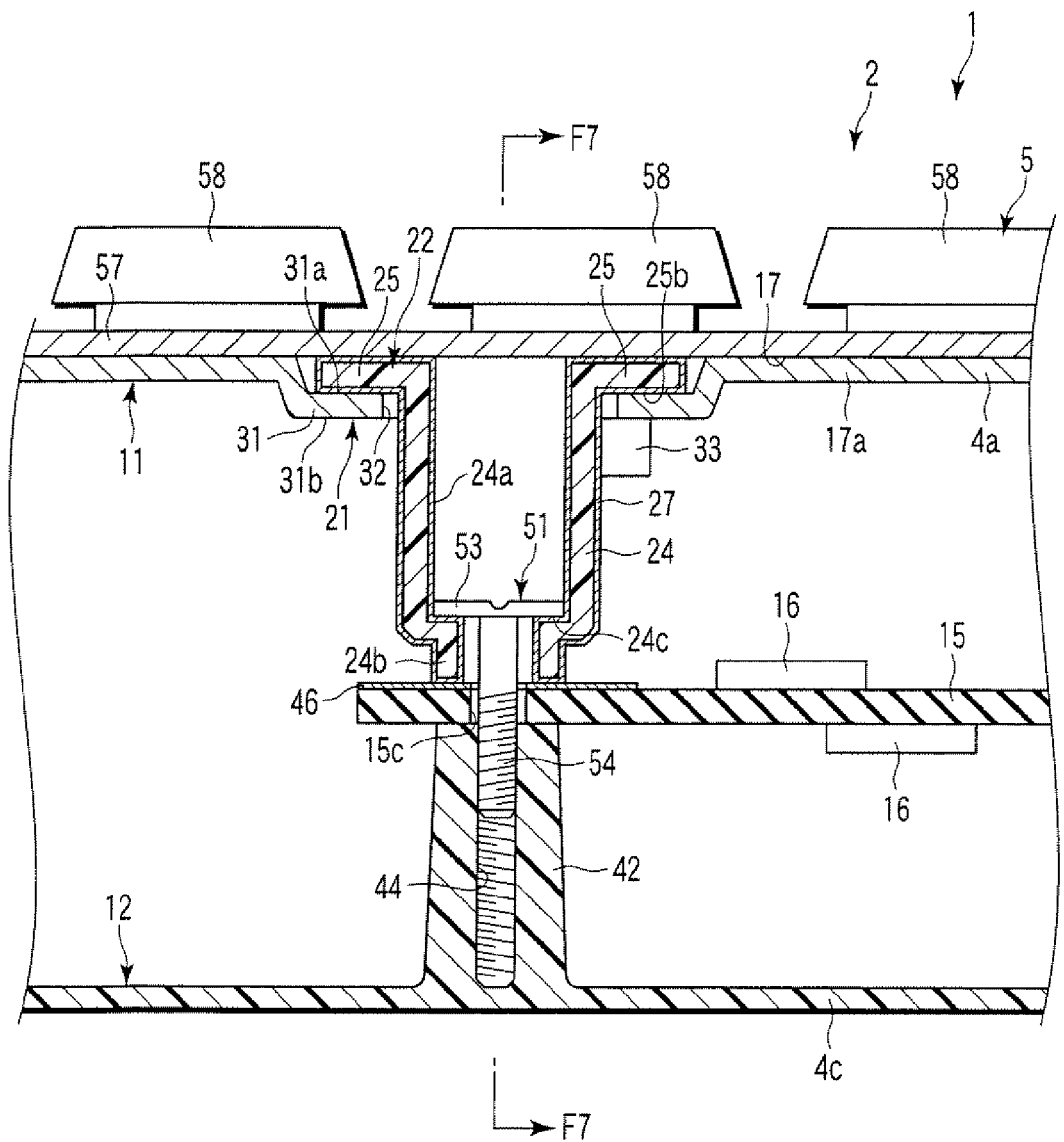
FIG. 6 is an exemplary cross sectional view showing the main body, taken along the line F6-F6 in FIG. 4.

The body part 24, cylindrical in external configuration, has an axially extending through-hole 24a. The top end of the body part 24 has a small diameter part 24b, one size smaller than the body part. As shown in FIG. 6, the inside diameter of the through-hole 24a is small in a portion where the body part changes to the small diameter part 24b. The through-hole 24a is stepped at the mid position to form a step 24c.

The pair of second flange parts 26 extend from a mid position of the body part 24 in the radial direction of the body part 24. The pair of second flange parts 26 extend from the body part 24 in opposite directions. The first flange parts 25 are provided at the end of the body part 24, which is opposite to the end thereof having the small diameter part 24b. The first flange parts 25 and the second flange parts 26 extend to the spaces, which are not overlapped with each other when viewed in the axial direction of the boss member 22.

The boss member 22 is formed separately from the top cover 11 and the bottom cover 12. The boss member 22 is made of synthetic resin, for example. As shown in FIG. 6, by way of example, the boss member 22 includes a conductive layer 27 on the surface thereof. The conductive layer 27 is formed by a surface treatment process, such as a metal plating process or vapor plating process. The conductive layer 27 may also be formed by, for example, coating a conductive paint. The material of the conductive layer 27 is not limited to specific materials, but may be any material if it is electrically conductive. The conductive layer 27 is not essential to the boss member 22.

As shown in FIG. 4, the boss mounting part 21 includes a bottom wall 31 and an opening 32 opened to the bottom wall 31. The bottom wall 31 is depressed below the bottom wall 17a of the keyboard placing part 17 by, for example, a thickness of the first flange part 25 of the boss member 22. The opening 32 is opened to the inside of the casing 4. The opening 32 is formed in conformity with the external configurations of the body part 24 and the second flange parts 26. That is, the bottom wall 31 is arranged not in opposition to the body part 24 and the second flange parts 26 of the boss member 22, but in opposition to the first flange parts 25.

The bottom wall 31 of the boss mounting part 21 includes an outer surface 31a to be an outer side of the casing, and an inner surface 31b to be an inner side of the casing when the casing 4 is assembled. As shown in FIG. 5, the boss mounting part 21 includes a pair of rotation stoppers 33 and one convex part 34. The rotation stoppers 33 are stopper pieces protruded from the inner surface 31b of the bottom wall 31 to the inside of the casing 4. The convex part 34 protrudes from the inner surface 31b of the bottom wall 31 to the inside of the casing 4. The convex part 34 is a part of the inner surface 31b.

Now, a method of mounting the boss member 22 to the boss mounting part 21 will be described.

Figure 7:
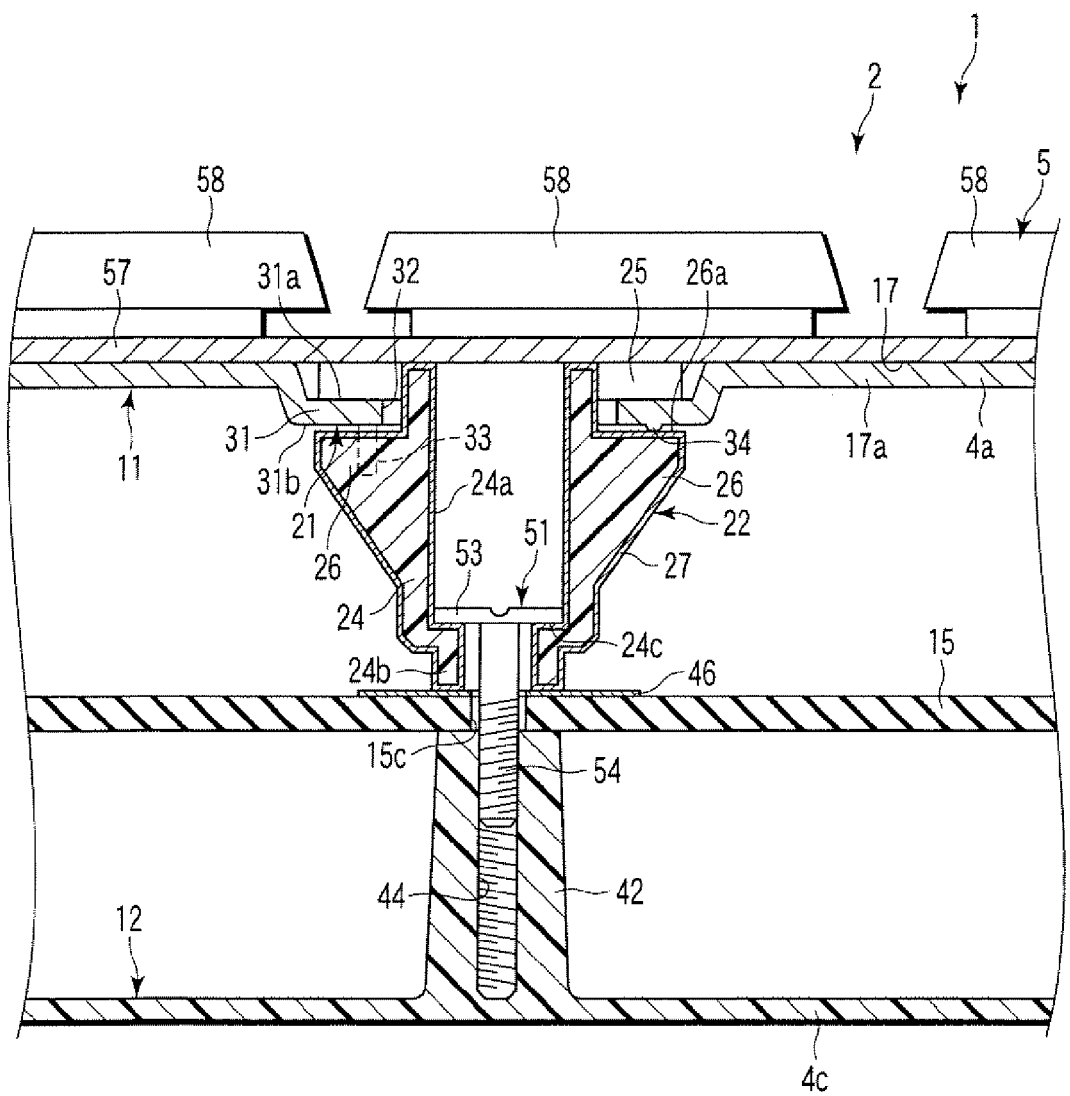
FIG. 7 is an exemplary cross sectional view showing the main body, taken along the line F7-F7 in FIG. 6.

The boss member 22 is mounted to the boss mounting part 21 before the top cover 11 is combined with the bottom cover 12. To assemble the casing 4, the second flange parts 26 of the boss member 22 and the body part 24 are inserted into the opening 32 of the boss mounting part 21 from the side which is to be outside of the casing 4 when the casing 4 is assembled. When the boss member 22 is inserted a predetermined distance, the lower surface 25b of the first flange part 25 comes in contact with the bottom wall 31 of the boss mounting part 21. In a state that the first flange part 25 is in contact with the bottom wall 31, the boss member 22 is turned by, for example, 90° in the circumferential direction. When the boss member 22 is turned, the second flange part 26 comes in contact with the rotation stopper 33 to be stopped thereat. In a state that the second flange part 26 is in contact with the rotation stopper 33, the upper surface 26a of the second flange part 26 is placed in opposition to the inner surface 31b of the bottom wall 31. As shown in FIG. 7, the second flange part 26 overlaps the convex part 34.

When the second flange part 26 overlaps the convex part 34, the lower surface 25b of the first flange part 25 is pressed against the outer surface 31a of the bottom wall 31. The conductive layer 27 formed over the boss member 22 comes in contact with the top cover 11 on the lower surface 25b of the first flange part 25 and the upper surface 26a of the second flange part 26.

The boss member 22 thus mounted serves as a boss protruding from the top cover 11 to the inside of the casing 4. The conductive layer 27 of the boss member 22 is electrically continuous to the top cover 11 at the first and second flange parts 25 and 26.

As shown in FIG. 3, a plurality of first bosses 41, for example, are provided at the rear end part of the bottom wall 17a of the keyboard placing part 17. The first bosses 41 are formed integral with the bottom wall 17a of the keyboard placing part 17, as a part of the top cover 11, for example. The first bosses 41 extend to the inside of the casing 4, while being opposed to the second area 15b of the printed circuit board 15. Each boss 41, like the boss member 22, includes a small diameter part 24b and a through-hole 24a having a step 24c.

The bottom cover 12 includes second and third bosses 42 and 43. The second boss 42 is provided in opposition to the boss member 22. The third boss 43 is provided in opposition to the first boss 41. The second and third bosses 42 and 43 each include a female screw hole 44 having a female thread therein. The printed circuit board 15 is placed between the boss member 22 and the second boss 42 and between the first boss 41 and the third boss 43.

A through-hole 15c is formed at a position of the printed circuit board 15 at which the printed circuit board is put between the boss member 22 and the second boss 42. Another through-hole 15c is formed at a position of the printed circuit board 15 at which the printed circuit board is put between the first boss 41 and the third boss 43. A ground pattern 46 is formed in an area of the printed circuit board 15, which is in contact with the boss member 22. The ground pattern 46 is one example of a conductive layer and one example of "a conductive part" of the invention.

The portable computer 1 includes first and second screws 51 and 52. The first and second screws 51 and 52 each have a screw head 53 and a screw shaft 54. After the top cover 11 is combined with the bottom cover 12, the first and second screws 51 and 52 are applied to the relevant positions from outside of the casing 4. Specifically, the first screw 51 is inserted into the through-hole 24a of the boss member 22. The screw head 53 of the first screw 51 is in contact with the step 24c of the through-hole 24a. The screw shaft 54 of the first screw 51 is engaged to the screw hole 44 of the second boss 42 through the through-hole 15c of the printed circuit board 15. As a result, the printed circuit board 15 and the second boss 42 are both fastened together. The printed circuit board 15 and the third boss 43 are likewise fastened together by the second screw 52. As a result, the top cover 11 and the bottom cover 12 are fastened together, and the printed circuit board 15 is secured to the inside of the casing 4.

In this way, the boss member 22 is interposed between the top cover 11 and the printed circuit board 15. The conductive layer 27 of the boss member 22 contacts the ground pattern 46 of the printed circuit board 15 and is electrically continuous to the ground pattern 46. The conductive layer 27 of the boss member 22 and the ground pattern 46 of the printed circuit board 15 are overlapped with each other in the fastening direction of the first screw 51.

The keyboard unit 5 includes a base 57 and a plurality of keys 58 mounted on the base 57. The base 57 includes a sheet metal member and a plate member placed between the sheet metal member and the keys 58. The keys 58 are supported by a support mechanism provided on the plate member. When the keyboard unit 5 is mounted on the keyboard placing part 17, the boss member 22 and the boss mounting part 21 are covered with the keyboard unit 5.

Operations of the portable computer 1 will now be described.

The conductive layer 27 of the boss member 22 is electrically connected to the ground pattern 46 of the printed circuit board 15 at the small diameter part 24b. Further, the conductive layer 27 of the boss member 22 is electrically connected to the metal top cover 11 at the first and second flange parts 25 and 26. That is, the printed circuit board 15 is electrically connected to the top cover 11 by way of the conductive layer 27 of the boss member 22. With this electrical connection, the printed circuit board 15 and the top cover 11 are at the same potential, and hence, interference caused by electromagnetic waves, which arises from the potential difference, is substantially eliminated.

When the portable computer 1 is operated, the heating elements 16 generate heat. Part of the heat of the heating elements 16 is transferred to the printed circuit board 15, and the printed circuit board 15 becomes warm. At this time, the temperature rise in the second area 15b of the printed circuit board 15 is smaller than that in the first area 15a.

Since the boss member 22 is made of synthetic resin, its thermal conductivity is low, so heat of the first area 15a of the printed circuit board 15 is not very transferred to the top cover 11 by way of the boss member 22. The temperature rise in the top cover 11 is therefore lower than that in the printed circuit board 15.

Part of heat from the second area 15b of the printed circuit board 15 is transferred to the top cover 11 by way of the metal first boss 41. However, the temperature of the top cover 11 cannot be high since the second area 15b does not become that hot.

The portable computer 1 thus constructed is capable of suppressing a temperature rise in the casing 4. Where the boss, which is made of the same material as that of the top cover 11, for example, is in contact with the printed circuit board 15, part of the heat of the printed circuit board 15 is transferred to the top cover through the boss. Accordingly, there is the possibility that the temperature of the top cover will rise.

On the other hand, the portable computer 1 of this embodiment is capable of impeding the heat transfer from the printed circuit board 15 to the top cover 11 by forming the boss contacting the printed circuit board 15 as a separate member, and by forming the boss of synthetic resin of a smaller thermal conductivity than that of the metal. This structural feature successfully suppresses the temperature rise of the top cover 11, and the casing 4.

The portable computer 1 of the embodiment allows the fastening boss to be provided near the member that becomes hot when the computer is operated. This structural feature increases design freedom of the portable computer 1.

For example, in the case where the boss member 22 has the conductive layer 27 formed on the surface thereof, the printed circuit board 15 is electrically continuous to the top cover 11 by way of the conductive layer 27 of the boss member 22. This indicates that appropriate utilization of the fastening boss member 22 can suppress the generation of an electromagnetic wave. Accordingly, the portable computer 1 is capable of securing the suppression of electromagnetic wave generation, and suppressing the temperature rise of the casing 4.

When the printed circuit board 15 and the boss member 22 are fastened together by means of the first screw 51, the ground pattern 46 of the printed circuit board 15 and the conductive layer 27 of the boss member 22 are firmly and electrically connected to each other. The connection of them is more stable than that in the case using an grounding spring, for example. For example, when the conductive layer 27 of the boss member 22 is overlapped with the ground pattern 46 of the printed circuit board 15 as viewed in the fastening direction of the first screw 51, the conductive layer 27 and the printed circuit board 15 are more firmly connected together.

Where the boss member 22 includes the first and second flange parts 25 and 26, the bottom wall 31 of the boss mounting part 21 can be vertically sandwiched therebetween. As a result, a stable electrical connection state is set up between the conductive layer 27 of the boss member 22 and the bottom wall 31. With provision of the convex part 34 on the bottom wall 31, the first flange parts 25 of the boss member 22 are pressed against the bottom wall 31. Consequently, a stable connection state is set up between the conductive layer 27 and the bottom wall 31.

In the case where the bottom cover 12 has the second boss 42, and the printed circuit board 15 and the bottom cover 12 are both fastened to the boss member 22, the number of bosses to be provided on the top cover 11 is reduced. This feature leads to size and cost reduction of the casing 4.

The top cover 11 having the palm rest part 18 and supporting the keyboard unit 5 is one of the portions of the computer the user frequently touches. The boss provided on the top cover 11 is separately formed as the boss member 22, whereby the temperature rise in the portions the user frequently touches is suppressed.

It is effective to form the first bosses 41 as separate members as in the case of the boss member 22 in the light of suppressing the temperature rise of the casing 4. However, it is not advantageous to form all the bosses as separate members as in the case of the boss member 22 in the light of cost reduction and improvement of the assembly workability. A structure is allowed in which the boss being in opposition to the first area 15a of the printed circuit board 15, which has larger heat, is made of synthetic resin, and the bosses 41 opposed to the second area 15b are formed integral with the top cover 11. Such a structure makes it possible to effectively suppress the temperature rise of the casing 4 without excessively impairing the cost reduction effect and the assembly workability.

The structure in which the opening 32 is provided to which the boss member 22 is mounted and the boss member 22 has the through-hole 24a, allows one to attach and detach the first screw 51 to and from outside of the casing 4. This feature enhances the assembly ease of the portable computer 1. Further, it makes it possible to design the casing 4 such that the first screw 51 and the second screw 52 are applied in the same direction.

The boss mounting part 21 is provided on the keyboard placing part 17. With this structural feature, the boss mounting part 21 and the boss member 22 are finally concealed with the keyboard unit 5. This does not make the outward appearance of the portable computer 1 unattractive.

In the portable computer 1 thus described, the first screw 51 is applied from the top cover 11 toward the bottom cover 12. Naturally, the embodiment of the invention is not limited thereto, and if required, the first screw 51 may be applied from the bottom cover 12 toward the top cover 11 as shown in FIG. 8.

Figure 9:
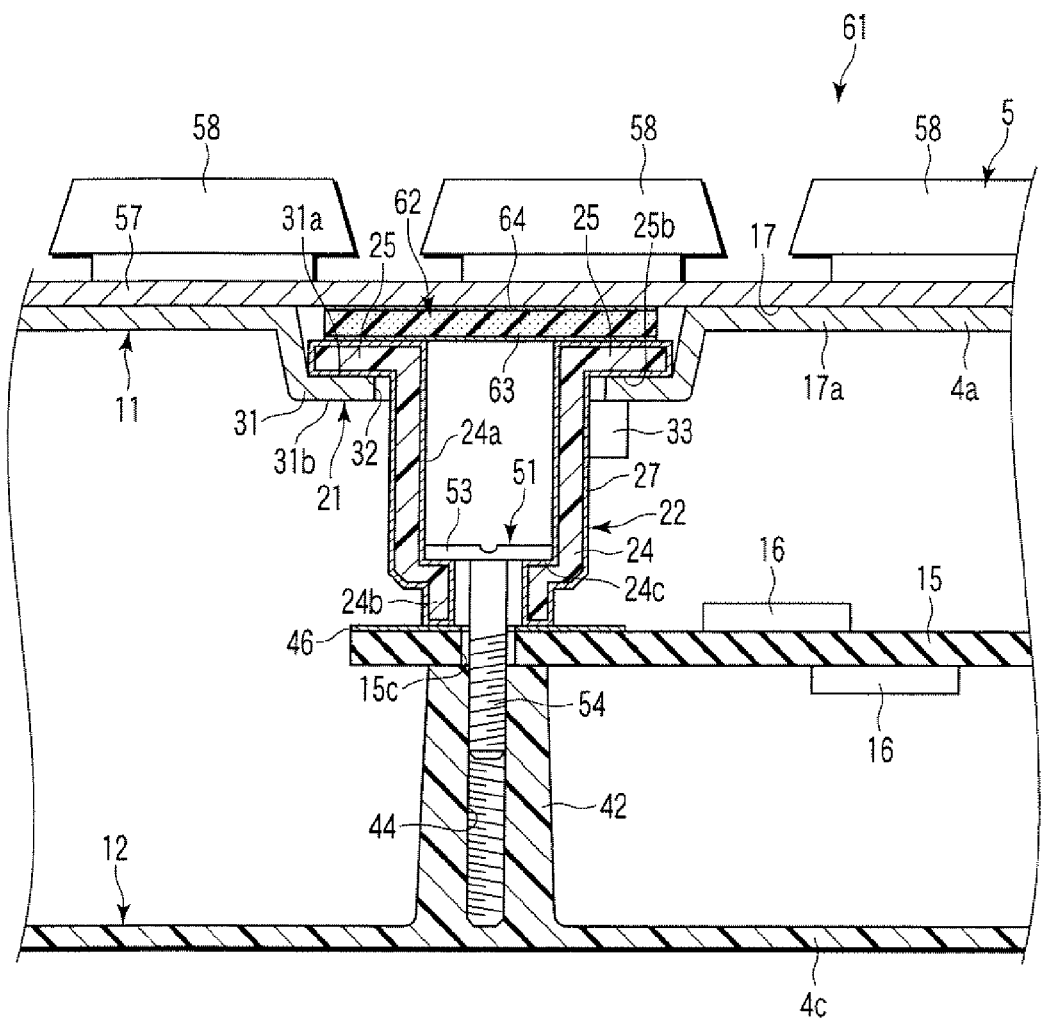
FIG. 9 is an exemplary cross sectional view showing a portable computer according to a second embodiment of the invention.

Now, a portable computer 61 as an electronic device, which is a second embodiment of the present invention, will be described with reference to FIG. 9. In the second embodiment, the same functional components as those of the portable computer 1 of the first embodiment are denoted by the same reference numerals, and the detailed description thereof is omitted. The portable computer 61 includes a conductive member 62, in addition to the components contained in the first embodiment.

The conductive member 62 includes an elastic core member 63 and a conductive cloth 64 covering the core member 63. An example of the core member 63 is a sponge having elasticity. The conductive member 62 is compressively held between the boss member 22 and the keyboard unit 5. The conductive cloth 64 of the conductive member 62 is electrically continuous to the conductive layer 27 of the boss member 22 and the base 57 of the keyboard unit 5.

In the portable computer 61 thus constructed, the potential of the keyboard unit 5 is equal to that of the top cover 11 and the printed circuit board 15. Therefore, further suppression of electromagnetic wave generation is secured in addition to the useful effects provided by the portable computer 1 of the first embodiment.

Figure 10:
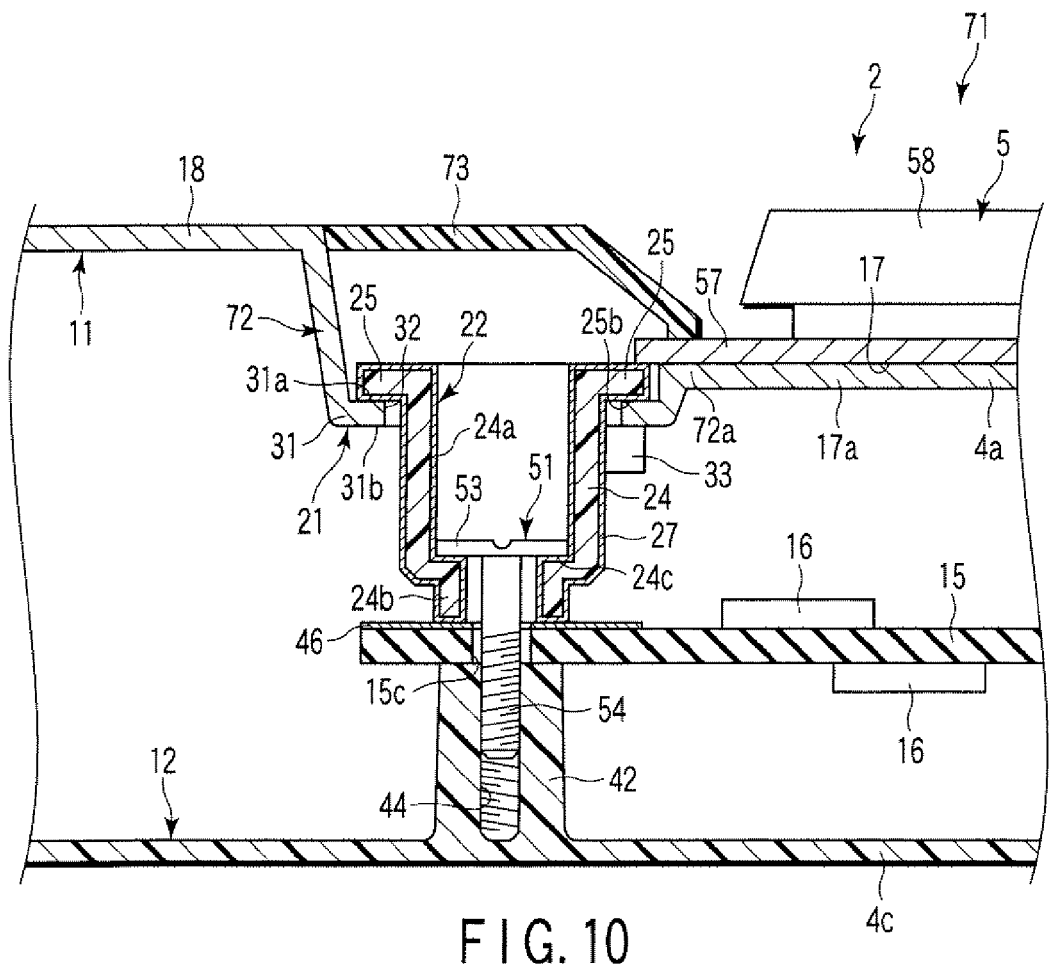
FIG. 10 is an exemplary cross sectional view showing a portable computer according to a third embodiment of the invention.

A portable computer 71 as an electronic device according to a third embodiment of the present invention will be described with reference to FIG. 10. In the third embodiment, the same functional components as those of the portable computer 1 of the first embodiment are denoted by the same reference numerals, and the detailed description thereof is omitted. In the portable computer 71, the mounting position of the boss member 22 is different from that in the first embodiment. The remaining structural arrangement of the portable computer is substantially the same as in the first embodiment.

In the top cover 11 of the portable computer 71, a keyboard cover placing part 72 is located between the keyboard placing part 17 and the palm rest part 18. A keyboard cover 73 is placed on the keyboard cover placing part 72. The keyboard cover 73 presses the edge part of the keyboard unit 5 placed on the keyboard placing part 17 against the keyboard placing part 17. In other words, the keyboard cover 73 is a holder for holding the keyboard unit 5 on the keyboard placing part 17. A bottom wall 72a of the keyboard cover placing part 72 is provided with a boss mounting part 21.

A boss member 22 is mounted to the boss mounting part 21. The keyboard cover 73 mounted on the keyboard cover placing part 72 hides the boss mounting part 21 and the boss member 22 from outside of the casing 4.

The portable computer 71 thus constructed is capable of suppressing the temperature rise of the casing 4. A structural feature that the boss contacting the printed circuit board 15 is formed as a separate member, and synthetic resin of low thermal conductivity is used for the boss, which impedes the heat transfer from the printed circuit board 15 to the top cover 11. With the provision of the conductive layer 27 on the surface of the boss member 22, the temperature rise of the casing 4 is suppressed as well as the electromagnetic wave interference.

The boss mounting part 21 is provided on the keyboard cover placing part 72. With this structural feature, the boss mounting part 21 and the boss member 22 are finally concealed with the keyboard cover 73. This does not make the outward appearance of the portable computer 71 unattractive.

Figure 11:
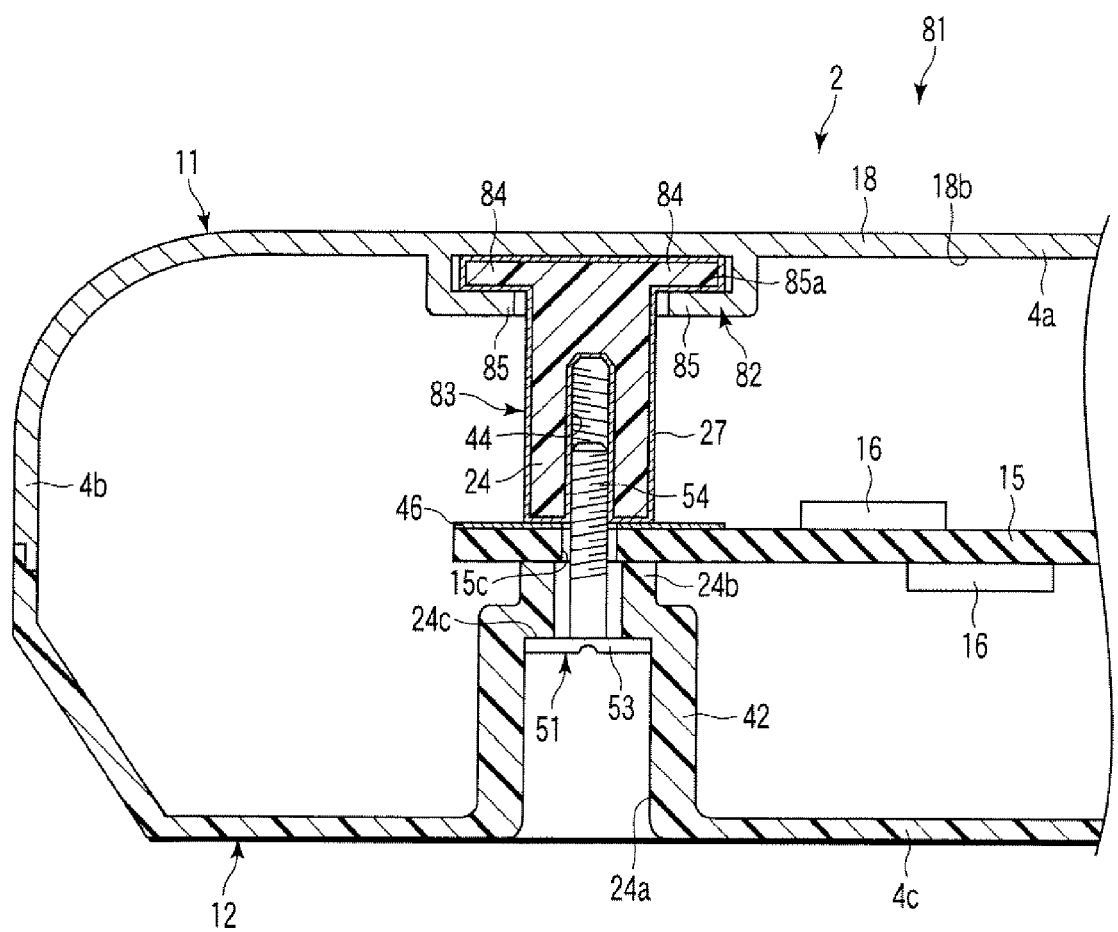
FIG. 11 is an exemplary cross sectional view showing a portable computer according to a fourth embodiment of the invention.

A portable computer 81 as an electronic device, which is a fourth embodiment of the present invention, will be described with reference to FIG. 11. In the fourth embodiment, the same functional components as those of the portable computer 1 of the first embodiment are denoted by the same reference numerals, and the detailed description thereof is omitted.

Figure 12:
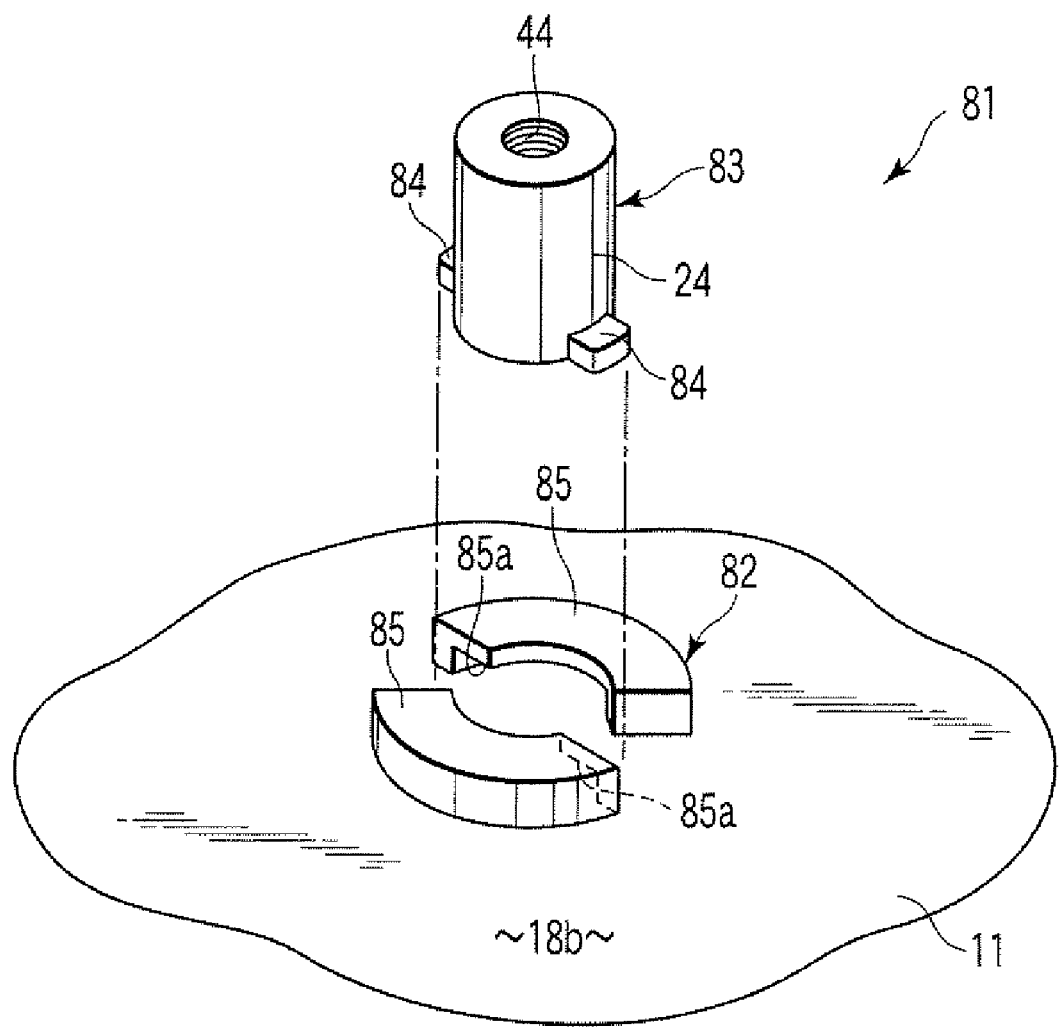
FIG. 12 is an exemplary perspective view showing the boss mounting portion in the fourth embodiment, when viewed from the inside of the computer casing.

In the portable computer 81, a boss mounting part 82 is provided on the inner surface of the palm rest part 18. A boss member 83 is removably mounted on the boss mounting part 82. As shown in FIG. 12, the boss member 83 includes a body part 24 cylindrical in shape, and a pair of flange parts 84. Those flange parts 84 extend from the body part 24 in opposite directions.

The boss mounting part 82 is provided with a pair of support walls 85 extending inside of the casing 4. The support walls 85 each include a groove 85a between the support walls themselves and the lower surface 18b of the palm rest part 18.

The boss member 83 is inserted between the two support walls 85. When the boss member 83 is turned in the circumferential direction in a state that the boss member 83 is pressed against the lower surface 18b of the palm rest part 18, the flange parts 84 engage with the grooves 85a. In this way, the boss member 83 is mounted to the boss mounting part 82.

The top cover 11, the printed circuit board 15 and the bottom cover 12 are fastened together by means of the screw 51. The ground pattern 46 of the printed circuit board 15 is electrically connected to the top cover 11 through the conductive layer 27 of the boss member 83.

The portable computer 81 thus constructed is capable of suppressing the temperature rise of the casing 4. A structural feature that the boss contacting the printed circuit board 15 is formed as a separate member, and synthetic resin of low thermal conductivity is used for the boss, impedes the heat transfer from the printed circuit board 15 to the top cover 11. With the provision of the conductive layer 27 on the surface of the boss member 83, the temperature rise of the casing 4 is suppressed as well as the electromagnetic wave interference.

When the boss mounting part 82 is located inside the casing 4, the boss mounting part 82 and the boss member 83 are not exposed outside of the casing 4. This structural feature does not make the outward appearance of the portable computer 81 unattractive. The palm rest part 18 is one of the portions of the portable computer the user is readily accessible for operation. Accordingly, satisfactory suppression of the temperature rise of the palm rest part 18 ensures comfortable operation by the user.

Now, a portable computer 91 as an electronic device, which is a fifth embodiment of the present invention, will be described with reference to FIG. 13. In the fifth embodiment, the same functional components as those of the portable computers 1 and 81 of the first and fourth embodiment are denoted by the same reference numerals, and the detailed description thereof is omitted. The bottom cover 12 in the fifth embodiment is made of metal. The top cover 11 may be made of metal or synthetic resin.

The casing 4 of the portable computer 91 contains a hard disc drive 92 (abbreviated as HDD). The HDD 92 generates heat when the computer is in operation. The HDD 92 is held with an HDD holder 93. The HDD holder 93 includes a holder part 93a for holding the HDD 92, and a mounting part 93b, which extends from the holder part 93a and is to be mounted on the boss member 83. The HDD holder 93 is one example of "an in-casing member" of the invention.

When the portable computer 91 is in operation, the HDD 92 generates heat. Part of the heat generated by the HDD 92 transfers to the HDD holder 93, thus the HDD holder 93 becomes warm. Since the boss member 83 is of low thermal conductivity, heat of the HDD holder 93 does not very transfer through the boss member 83 to the bottom cover 12.

The portable computer 91 thus constructed is capable of suppressing the temperature rise of the casing 4. A structure feature that the boss contacting the HDD holder 93 is formed as a separate member and synthetic resin having low thermal conductivity is used for the boss impedes the heat transfer from the HDD holder 93 to the bottom cover 12.

Figure 14:
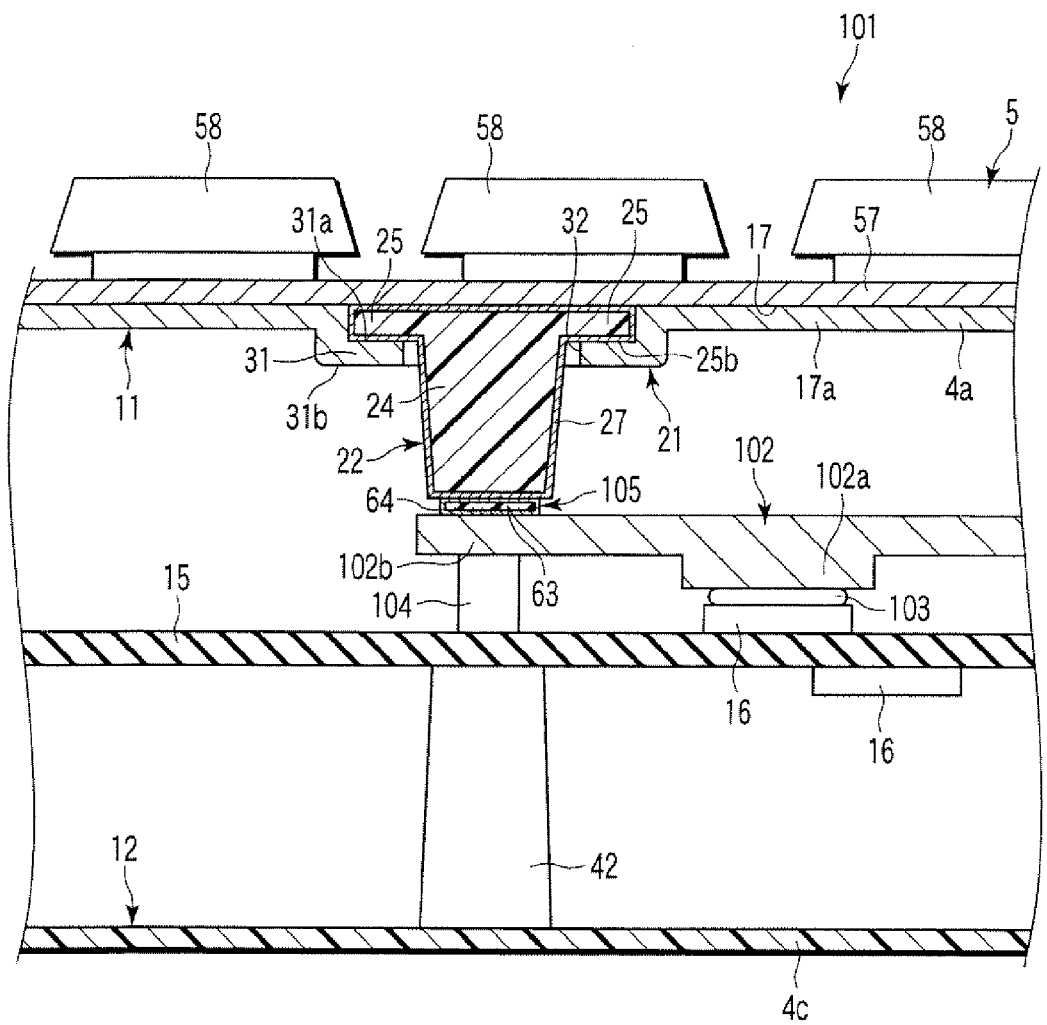
FIG. 14 is an exemplary cross sectional view showing a portable computer according to a sixth embodiment of the invention.

A portable computer 101 as an electronic device, which is a sixth embodiment of the present invention, will be now described with reference to FIG. 14. In the sixth embodiment, the same functional components as those of the portable computer 1 of the first embodiment are denoted by the same reference numerals, and the detailed description thereof is omitted.

The portable computer 101 includes a heat plate 102 for heat radiation. The heat plate 102 is one example of the in-casing member of the invention. The heat plate 102 is made of metal, for example, an aluminum alloy. The heat plate 102 includes a heat receiving part 102a thermally connected to the heating element 16, and a mounting part 102b extending to a position out of the heating element 16. A heat transfer member 103 is interposed between the heat receiving part 102a and the heating element 16, whereby it ensures reliable thermal connection therebetween. By way of example, the heat transfer member 103 may be a heat transfer sheet or grease.

A stud 104 is provided between the mounting part 102b and the printed circuit board 15. The stud 104 may be cylindrical in shape, for example. A screw (not shown) passes through the heat plate 102, the stud 104, the printed circuit board 15, and the second boss 42, whereby the heat plate 102 and the printed circuit board 15 are mounted within the casing 4.

The portable computer 101 includes a boss mounting part 21 provided in the keyboard placing part 17. A boss member 22 is removably mounted on the boss member 22. The boss member 22 includes a body part 24 and first and second flange parts 25 and 26. The body part 24 may take the form of a hollow or solid cylinder. The boss member 22 is a support projection for minimizing the bending of the keyboard placing part 17. The boss member 22 faces the heat plate 102.

A buffering member 105 is provided between the boss member 22 and the heat plate 102. In an example of the buffering member 105, a sponge-like core member 63 is covered with a conductive cloth 64. The heat plate 102 is electrically connected to the top cover 11 through the conductive cloth 64 and the conductive layer 27 of the boss member 22.

When the user depresses one of keys 58 of the keyboard unit 5, a downward force is applied to the keyboard unit 5. When the bottom wall 17a of the keyboard placing part 17 bends under the downward force, the boss member 22 is interposed between the bottom wall 17a of the keyboard placing part 17 and the heat plate 102 to support the keyboard placing part 17 from its underside. The boss member 22 supports the keyboard placing part 17 to minimize the bending of the keyboard placing part 17.

The portable computer 101 thus constructed is capable of suppressing the temperature rise of the casing 4. A structural feature that the boss contacting the heat plate 102 is formed as a separate member, and synthetic resin of low thermal conductivity is used for the boss, impedes the heat transfer from the heat plate 102 to the top cover 11. With provision of the conductive layer 27 on the surface of the boss member 22, the temperature rise of the casing 4 is suppressed as well as the electromagnetic wave interference. The printed circuit board 15, in place of the heat plate 102, may directly support the boss member 22.

While the portable computers 1, 61, 71, 81, 91, and 101 according to the first to sixth embodiments have been described, it is understood that the present invention is not limited to those described embodiments. The constituent components of the first to sixth embodiments may be appropriately combined.

The mounting of the boss members 22 and 83 may be made not only by mechanical bonding but also by adhesion or welding, for example. The in-casing member may be a heating element which generates heat by itself. It is evident that the electronic device to which the present invention may be applied is not limited to the portable computer.

While certain embodiments of the inventions have been described, these embodiments have been presented by way of example only, and are not intended to limit the scope of the inventions. Indeed, the novel methods and systems described herein may be embodied in a variety of other forms; further-more, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
a casing at least a part of which is made of metal, the casing including an opening to an inside of the casing;
a heat generating portion in the casing; and
a boss member formed separately from the casing and made of resin, the boss member being inserted into the opening of the casing and interposed between the casing and the heat generating portion, the boss member includes a hole into which a screw is inserted to pass through the boss member, the screw being attachable to and detachable from outside of the casing.

2. The electronic device according to claim 1, wherein the screw fixes the heat generating portion.

3. The electronic device according to claim 2, wherein a conductive layer is formed on the surface of the boss member.

4. The electronic device according to claim 3, wherein the conductive layer of the boss member contacts the heat generating portion and the metal part of the casing.

5. The electronic device according to claim 4, wherein the heat generating portion includes a conductive part contacting the conductive layer of the boss member, and the conductive layer of the boss member and the conductive part of the heat generating portion are overlapped with each other in a fastening direction of the screw.

6. The electronic device according to claim 1, wherein the boss member includes a body part to be inserted into the opening, a first part of the body part which contacts an outer surface of the casing, and a second part of the body part which contacts an inner surface of the casing.

7. The electronic device according to claim 6, wherein the casing includes a first cover made of metal and a second cover combined with the first cover so as to accommodate the heat generating portion in a space defined between the second cover and the first cover, the boss member is attached to the first cover, the second cover is provided with a boss facing the boss member, and the boss member and the boss are fastened together by means of the screw.

8. The electronic device according to claim 7, wherein the first cover is a top cover and the second cover is a bottom cover.

9. The electronic device according to claim 8, further comprising a keyboard unit, wherein the first cover includes a keyboard placing part to which the keyboard unit is removably mounted, the opening to which the boss member is mounted is opened to the keyboard placing part, and the boss member mounted to the opening is covered with the keyboard unit placed on the keyboard placing part.

10. An electronic device comprising:
a first cover;
a second cover to be combined with the first cover so as to define a space between the second cover and the first cover;
a first boss protruding from the first cover into the space, the first boss comprises a first hole into which a screw is inserted;
a second boss facing the first boss and comprising a second hole, the second cover being provided with the second boss; and
a heat generating portion in the space, the heat generating portion being interposed between the first boss and the second boss, and comprising a through-hole facing the first hole,
wherein the first cover is made of metal, the first boss is formed separately from the first cover and made of resin, and the screw is inserted into the first hole and the second hole and fastens the first and second covers together.

11. The electronic device according to claim 10, wherein the screw fixes the heat generating portion.

12. The electronic device according to claim 11, wherein a conductive layer is provided on the surface of the first boss.

13. The electronic device according to claim 12, wherein the heat generating portion includes a conductive part, and the conductive layer of the first boss contacts the conductive part of the heat generating portion and the first cover.

14. The electronic device according to claim 13, wherein the conductive layer of the first boss and the conductive part of the heat generating portion are overlapped with each other in a fastening direction of the screw.

15. An electronic device comprising:
a casing at least a part of which is made of metal, the part comprising an opening;
a heat generating portion in the casing;
a screw fixing the heat generating portion; and
a boss member made of resin formed separately from the casing and interposed between the casing and the heat generating portion, the boss member comprising a through-hole and being configured to expose the through-hole outside the casing through the opening, the screw being inserted into the through-hole and being attachable to and detachable from outside of the through-hole.

* * * * *